(12) United States Patent
Nelson et al.

(10) Patent No.: US 9,936,565 B2
(45) Date of Patent: Apr. 3, 2018

(54) SYSTEM FOR INTEGRATED LIGHTING CONTROL, CONFIGURATION, AND METRIC TRACKING FROM MULTIPLE LOCATIONS

(71) Applicant: Honeywell International Inc., Morris Plains, NJ (US)

(72) Inventors: John Nelson, Eden Prairie, MN (US); John Marden, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/190,781

(22) Filed: Jun. 23, 2016

(65) Prior Publication Data

US 2016/0309567 A1    Oct. 20, 2016

Related U.S. Application Data

(63) Continuation of application No. 13/831,249, filed on Mar. 14, 2013, now Pat. No. 9,386,665.

(51) Int. Cl.
    *H05B 37/02*    (2006.01)
(52) U.S. Cl.
    CPC ..... *H05B 37/0227* (2013.01); *H05B 37/0218* (2013.01); *H05B 37/0245* (2013.01); *H05B 37/0281* (2013.01)
(58) Field of Classification Search
    CPC ............ H05B 37/0227; H05B 37/0218; H05B 37/0245; H05B 37/0281
    USPC ................................................ 315/149–159
    See application file for complete search history.

(56) References Cited

U.S. PATENT DOCUMENTS

| | | |
|---|---|---|
| 3,936,696 A | 2/1976 | Gray |
| 4,449,074 A | 5/1984 | Luchaco |
| 4,538,218 A | 8/1985 | Watson |
| 4,728,866 A | 3/1988 | Capewell et al. |
| 4,889,999 A | 12/1989 | Rowen |
| 4,951,046 A | 8/1990 | Lambert et al. |
| 5,005,211 A | 4/1991 | Yuhasz |
| 5,035,607 A | 7/1991 | Peterson |
| 5,117,178 A | 5/1992 | Roth |
| 5,187,655 A | 2/1993 | Post et al. |
| 5,191,265 A | 3/1993 | D'Aleo et al. |
| 5,247,280 A | 9/1993 | Incorvala et al. |
| 5,248,919 A | 9/1993 | Hanna et al. |
| 5,357,170 A | 10/1994 | Luchaco et al. |

(Continued)

OTHER PUBLICATIONS

Cree, "Cree LED Luminares Featuring Embedded Lutron Ecosystem Technology," 3 pages, 2012.

(Continued)

*Primary Examiner* — Brandon S Cole
(74) *Attorney, Agent, or Firm* — Seager, Tufte & Wickhem, LLP

(57) ABSTRACT

A mechanism for control and configuration of a lighting system from a user interface. For instance, a wall module designed as a user interface for a tenant to control the system may be implemented so as to be used not only to control the lighting system but also to configure it. The lighting system may involve a controller, circuits of lights, relays, motion and ambient detectors, scenes, schedules, and more. An additional user interface such as a wall module may be connected to the lighting system for control and configuration of the system.

19 Claims, 10 Drawing Sheets

(56) References Cited

U.S. PATENT DOCUMENTS

| | | | |
|---|---|---|---|
| 5,399,940 | A | 3/1995 | Hanna et al. |
| 5,430,356 | A | 7/1995 | Ference et al. |
| 5,463,286 | A | 10/1995 | D'Aleo et al. |
| 5,530,322 | A | 6/1996 | Ference et al. |
| 5,729,019 | A | 3/1998 | Krafthefer et al. |
| 5,831,693 | A | 11/1998 | McCartney, Jr. et al. |
| 5,929,781 | A | 7/1999 | Vosika |
| 5,938,317 | A | 8/1999 | Thornton |
| 5,949,200 | A | 9/1999 | Ference et al. |
| 5,990,635 | A | 11/1999 | Ference et al. |
| 6,011,326 | A | 1/2000 | Gershen |
| 6,046,550 | A | 4/2000 | Ference et al. |
| 6,098,943 | A | 8/2000 | Howard et al. |
| 6,114,816 | A | 9/2000 | Nuckolls et al. |
| 6,145,998 | A | 11/2000 | Lynch et al. |
| 6,166,640 | A | 12/2000 | Nishihira et al. |
| 6,188,181 | B1 | 2/2001 | Sinha et al. |
| 6,307,331 | B1 | 10/2001 | Bonasia et al. |
| 6,380,696 | B1 | 4/2002 | Sembhi et al. |
| 6,388,399 | B1 | 5/2002 | Eckel et al. |
| 6,419,375 | B1 | 7/2002 | Leadford et al. |
| 6,466,826 | B1 | 10/2002 | Nishira et al. |
| 6,545,434 | B2 | 4/2003 | Sembhi et al. |
| 6,577,136 | B1 | 6/2003 | Marques |
| 6,597,133 | B2 | 7/2003 | Hudson |
| 6,709,131 | B1 | 3/2004 | Herst et al. |
| 6,791,458 | B2 | 9/2004 | Baldwin |
| 6,803,728 | B2 | 10/2004 | Balasubramaniam et al. |
| 6,856,101 | B1 | 2/2005 | Hitchcock |
| 6,927,457 | B2 | 8/2005 | Walko, Jr. et al. |
| 6,930,455 | B2 | 8/2005 | Chansky et al. |
| 7,071,634 | B2 | 7/2006 | Johnson et al. |
| 7,085,627 | B2 | 8/2006 | Bamberger et al. |
| 7,111,952 | B2 | 9/2006 | Veskovic |
| 7,126,291 | B2 | 10/2006 | Kruse et al. |
| 7,166,970 | B2 | 1/2007 | Johnson et al. |
| 7,190,124 | B2 | 3/2007 | Kumar et al. |
| 7,234,841 | B2 | 6/2007 | Nash |
| 7,242,150 | B2 | 7/2007 | DeJonge et al. |
| 7,256,556 | B2 | 8/2007 | Lane et al. |
| 7,310,559 | B2 | 12/2007 | Walko, Jr. |
| 7,369,060 | B2 | 5/2008 | Veskovic et al. |
| 7,380,661 | B2 | 6/2008 | Gibler et al. |
| 7,382,100 | B2 | 6/2008 | Johnson et al. |
| 7,391,297 | B2 | 6/2008 | Cash et al. |
| 7,489,499 | B2 | 2/2009 | Abel |
| 7,498,952 | B2 | 3/2009 | Newman, Jr. |
| 7,504,782 | B2 | 3/2009 | Hasegawa et al. |
| 7,529,646 | B2 | 5/2009 | Lin et al. |
| 7,566,137 | B2 | 7/2009 | Veskovic |
| 7,566,987 | B2 | 7/2009 | Black et al. |
| 7,573,208 | B2 | 8/2009 | Newman, Jr. |
| 7,592,925 | B2 | 9/2009 | Nearhoof et al. |
| 7,615,937 | B2 | 11/2009 | Mishima |
| 7,645,975 | B2 | 1/2010 | Kawahara et al. |
| 7,658,509 | B2 | 2/2010 | Summers et al. |
| 7,667,413 | B2 | 2/2010 | Ikeda et al. |
| 7,683,755 | B2 | 3/2010 | Ostrovsky et al. |
| 7,687,940 | B2 | 3/2010 | Mosebrook et al. |
| 7,688,003 | B2 | 3/2010 | Yamada et al. |
| 7,723,925 | B2 | 5/2010 | Mosebrook et al. |
| 7,737,819 | B2 | 6/2010 | Chansky et al. |
| 7,741,732 | B2 | 6/2010 | Black et al. |
| 7,755,505 | B2 | 7/2010 | Johnson et al. |
| 7,759,878 | B2 | 7/2010 | Yufuku et al. |
| 7,764,162 | B2 | 7/2010 | Cash et al. |
| 7,772,724 | B2 | 8/2010 | Mosebrook et al. |
| 7,774,441 | B2 | 8/2010 | Frutiger et al. |
| 7,781,919 | B2 | 8/2010 | Black et al. |
| 7,787,485 | B2 | 8/2010 | Howe et al. |
| 7,800,319 | B2 | 9/2010 | Raneri |
| 7,824,058 | B2 | 11/2010 | Inoue et al. |
| 7,830,042 | B2 | 11/2010 | Keagy et al. |
| 7,847,440 | B2 | 12/2010 | Mosebrook et al. |
| 7,862,202 | B2 | 1/2011 | Laso et al. |
| 7,873,087 | B2 | 1/2011 | Morikawa et al. |
| 7,880,638 | B2 | 2/2011 | Veskovic et al. |
| 7,902,759 | B2 | 3/2011 | Newman, Jr. |
| 7,936,281 | B2 | 5/2011 | Cash et al. |
| RE42,425 | E | 6/2011 | DeJonge et al. |
| 7,973,498 | B2 | 7/2011 | Kawashima et al. |
| 7,990,075 | B2 | 8/2011 | Matsuzaki et al. |
| 7,994,733 | B2 | 8/2011 | Yufuku et al. |
| 8,014,888 | B2 | 9/2011 | Della-Porta |
| 8,022,348 | B2 | 9/2011 | Namba et al. |
| 8,035,529 | B2 | 10/2011 | Veskovic et al. |
| 8,040,080 | B2 | 10/2011 | Newman, Jr. et al. |
| 8,044,601 | B2 | 10/2011 | Matsuzaki et al. |
| 8,060,262 | B2 | 11/2011 | Burgin et al. |
| 8,078,290 | B2 | 12/2011 | Nelson |
| 8,115,404 | B2 | 2/2012 | Goriki et al. |
| 8,115,405 | B2 | 2/2012 | Yamahara et al. |
| 8,143,806 | B2 | 3/2012 | Mosebrook et al. |
| 8,143,809 | B2 | 3/2012 | Yamazaki et al. |
| 8,197,093 | B2 | 6/2012 | Veskovic |
| 8,198,824 | B2 | 6/2012 | Yufuku et al. |
| 8,207,677 | B2 | 6/2012 | Onishi et al. |
| 8,207,690 | B2 | 6/2012 | Kamoi et al. |
| 8,222,830 | B2 | 7/2012 | Nagata et al. |
| 8,222,835 | B2 | 7/2012 | Komatsu |
| 8,228,003 | B2 | 7/2012 | Kamoi |
| 8,228,163 | B2 | 7/2012 | Cash et al. |
| 8,232,741 | B2 | 7/2012 | Komatsu et al. |
| 8,232,746 | B2 | 7/2012 | Yufuku et al. |
| 8,247,987 | B2 | 8/2012 | Nakajo et al. |
| 8,294,385 | B2 | 10/2012 | Kumagai et al. |
| 8,297,798 | B1 | 10/2012 | Pittman et al. |
| 8,299,445 | B2 | 10/2012 | Yamada et al. |
| 8,305,014 | B1 | 11/2012 | Li et al. |
| 8,306,051 | B2 * | 11/2012 | Stocker ............... H04L 12/403 370/449 |
| 8,310,166 | B2 | 11/2012 | Nagaoka |
| 8,310,174 | B2 | 11/2012 | Ikeda |
| 8,312,347 | B2 | 11/2012 | Hick et al. |
| 8,330,374 | B2 | 12/2012 | Tanaka et al. |
| 8,337,059 | B2 | 12/2012 | Barnett et al. |
| 8,338,801 | B2 | 12/2012 | Ishiwata et al. |
| 8,344,651 | B2 | 1/2013 | Takaki et al. |
| 8,348,437 | B2 | 1/2013 | Watanabe et al. |
| 8,368,306 | B2 | 2/2013 | Cash et al. |
| 8,389,857 | B2 | 3/2013 | Petrillo |
| 8,395,321 | B2 | 3/2013 | Tanaka et al. |
| 8,395,327 | B2 | 3/2013 | Kumagai et al. |
| 8,410,706 | B2 | 4/2013 | Steiner et al. |
| 8,421,849 | B2 | 4/2013 | Kawamura |
| 8,430,518 | B2 | 4/2013 | Kirkup |
| 8,432,105 | B2 | 4/2013 | Takaki et al. |
| 8,436,542 | B2 | 5/2013 | Middleton-White et al. |
| 8,446,102 | B2 | 5/2013 | Leinen |
| 8,446,110 | B2 | 5/2013 | Tanigawa et al. |
| 8,459,802 | B2 | 6/2013 | Ono et al. |
| 8,474,985 | B2 | 7/2013 | Ueda |
| 8,476,565 | B2 | 7/2013 | Verfuerth |
| 8,484,329 | B2 | 7/2013 | Sato et al. |
| 8,492,996 | B2 | 7/2013 | Gehman |
| 8,497,766 | B2 | 7/2013 | Asayma et al. |
| 8,502,463 | B2 | 8/2013 | Mizukawa et al. |
| 8,502,475 | B2 | 8/2013 | Matsuzaki et al. |
| 8,536,984 | B2 | 9/2013 | Benetz et al. |
| 8,552,444 | B2 | 10/2013 | Ide et al. |
| 8,563,898 | B1 | 10/2013 | Wright et al. |
| 8,604,701 | B2 | 12/2013 | Verfuerth et al. |
| 2006/0130502 | A1 | 6/2006 | Wruck et al. |
| 2008/0136334 | A1 | 6/2008 | Robinson et al. |
| 2010/0138007 | A1 | 6/2010 | Clark et al. |
| 2010/0141153 | A1 * | 6/2010 | Recker ............... H05B 33/0803 315/149 |
| 2011/0031806 | A1 | 2/2011 | Altonen et al. |
| 2011/0084628 | A1 | 4/2011 | Welten et al. |
| 2011/0284730 | A1 | 11/2011 | Sturdevant |
| 2012/0001487 | A1 | 1/2012 | Pessina |
| 2012/0091213 | A1 | 4/2012 | Altonen et al. |
| 2012/0091804 | A1 | 4/2012 | Altonen et al. |
| 2012/0095601 | A1 | 4/2012 | Abraham et al. |

(56) References Cited

U.S. PATENT DOCUMENTS

| | | | | |
|---|---|---|---|---|
| 2012/0274222 | A1* | 11/2012 | Verfuerth | H05B 37/0227 315/158 |
| 2012/0303456 | A1* | 11/2012 | Raschke | H04L 41/082 705/14.58 |
| 2013/0113284 | A1 | 5/2013 | Altonen et al. | |
| 2014/0265875 | A1 | 9/2014 | Nelson et al. | |
| 2015/0342001 | A1* | 11/2015 | Lunn | H05B 33/0854 315/158 |
| 2016/0125594 | A1* | 5/2016 | Becker | B23K 9/0953 348/90 |

OTHER PUBLICATIONS

Creston Electronics, Inc., "Creston PAC2 Automation Control System," 2 pages, 2002.

Creston, "Creston PAC2M, Professional Automation Mini Control System," 2 pages, 2007.

Creston, "Creston PAC2 Professional Automation Control System Operations Guide," 32 pages, Jan. 2013.

GreenMax, "GreenMax Programming Manual, V2.14," 69 pages, Dec. 6, 2011.

Honeywell, "Zio/Zio Plus LCD Wall Modules TR70, TR71, TR75 With Sylk Bus," Specification Data, 4 pages, 2011.

http:///www.cree.com/lighting/products/indoor/controls/lutron-ecosystem, "Cree Lighting Products: Lutron EcoSystem Enabled Embedded Controls," 1 page, printed Nov. 6, 2013.

http://lightingcontrolassociation.org/lighting-control-made-easy-lutron-energi-savr-node . . . , "Lighting Control Mode Made Easy: Lutron Energi Savr Node is Modular, Scalable and Reliable," 1 page, Apr. 23, 2010.

http://lightingcontrolassociation.org/lutron-ecosystem-lighting-solution-provides-person . . . , "Lutron EcoSystem Lighting Solution Provides Personal Control with PC," 1 page, printed Nov. 6, 2013.

http://lightingcontrolsassociation.org/wattstopper-digital-lighting-management-photosen . . . , "WattStopper Digital Lighting Management Photosensors Named as BOM 2012 Top Products Award Winners," 1 page, Jan. 9, 2012.

http://nlightcontrols.com/lighting-controls/overview, "System Overview & Introduction—nLight," 4 pages, printed Nov. 6, 2013.

http://www.businesswire.com/news/home/20070517005875/en/Sensor-Switch-Introduce . . . , Sensor Switch Introduces Nlight Ligthing Control System at LIGHTFAIR 2007, 2 pages, May 17, 2007.

http://www.coloradolighting.com/industry-innovations/lutron-ecosystem/, "Colorado Lighting," 2 pages, printed Nov. 6, 2013.

http://www.creston.com/resources/procduct_and_programming_resources/catalogs_and_ . . . , "Product PAC2M—Professional Automation Mini Control System—Resources," 1 page, printed Nov. 6, 2013.

http://www.customcontrols.co.uk/brands/creston-home-automation/processors.aspx, "Creston Control & Automation Processors," 2 pages, printed Nov. 6, 2013.

http://www.lutron.com/en-US/Products/Pages/Components/EnergiSavrNode/Overview . . . , "Lutron Energi Savr Node Overview," 1 page, printed Nov. 6, 2013.

http://www.lutron.com/en-US/Products/Pages/Components/EnergiSavrNode/Models.aspx, "Lutron Energi Savr Node Models," 2 pages, printed Nov. 6, 2013.

http://www.lutron.com/en-US/Products/Pages/WholeBuildingSystems/SoftSwitchESN/O . . . , "Lutron Energi Savr Node with SoftSwitch Overview," 2 pages, printed Nov. 6, 2013.

http://www.prnewswire.com/news-releases/lunera-lighting-and-lutron-electronics-collab . . . , "The Helen Lamp by Lunera," 1 page, printed Nov. 6, 2013.

http://www.prnewswire.com/news-releases/lunera-lighting-and-lutron-electronics-collab . . . , "Lunera Lighting and Lutron Electronics Collaborate to Offer Fully Integrated, Ecosystem Enabled LED Fixtures," 3 pages, printed Nov. 6, 2013.

http://www.wattstopper.com/products/digital-lighting-management/room-controllers/lmr . . . , "LMRC-210 Series Digital On/Off/0-10 Volt Dimming Room Controllers," 3 pages, printed Nov. 6, 2013.

http://www.wattstopper.com/products/legacy-products/commercial-products/digital-light . . . , "Legacy—LMRC-310 Series On/Off/0-10 Volt Dimming Room Controllers with Network Bridge," 2 pages, 2013.

https://www.facebook.com/notes/leviton-manufacturing-co-inc/levitons-greenmax-lighti . . . , "Leviton's GreenMax Lighting Control System Awarded the Eco Cihac 2011Sustainable Innovation Awards at Expo Cihac," 4 pages, Jan. 13, 2012.

Leviton, "GreenMax Programming Manual, Daylight Harvesting and Dimming Module," 66 pages, prior to Mar. 14, 2013.

Leviton, "GreenMax Relay Control Panels for Smart Lighting Control Applications," 1 page, posted Sep. 24, 2012.

Leviton, "GreenMax Relay Control Panels Smart Lighting Control," 12 pages, revised Nov. 2011.

Leviton, "GreenMax Relay Control Panels, Modular Relay System Offers Unparalleled Flexibility," Product Data, 4 pages, 2011.

Leviton, "GreenMax Relay Modules Offers Dimming, Metering, and Daylight Harvesting Capabilities," 2 pages, 2010.

Leviton, "GreenMax Users Manual," Version 2.23, 70 pages, Sep. 18, 2011.

Leviton, "GreenMax Wiring Diagrams and Details," 21 pages, Feb. 22, 2012.

Lutron, "Dimming by Lutron," 3 pages, prior to Mar. 14, 2013.

Lutron, "EcoSystem Technical Guide," 32 pages, Mar. 2006.

Lutron, "Energi Savr Node EcoSystem Digital Fixture Controller," 13 pages, May 15, 2012.

WattStopper, "Digital Lighting Management, DLM Dimming System Addendum," 24 pages, Jun. 2010.

WattStopper, "Digital Lighting Management," 36 pages, Oct. 2010.

WattStopper, "Digital Lighting Management," Pub. No. 32403, 4 pages, Revised Feb. 2010.

WattStopper, "LMRC-100 Digital On/Off Room Controllers," 2 pages, Nov. 2010.

WattStopper, "LMRC-101 Digital Lighting Management (DLM) Single Relay Room Controller," Quick Start Guide, 2 pages, Jun. 19, 2009.

WattStopper, "LMRC-210 Series Digital On/Off/0-10 Volt Dimming Room Controllers," 2 pages, Aug. 2012.

WattStopper, "LMRC-310 Series Digital On/Off/0-10 Volt Dimming Room Controllers with Network Bridge," 2 pages, Nov. 2010.

* cited by examiner

31

CIRCUIT CONFIGURATION TEMPLATE

CIRCUIT NO. ___
LIGHT(S): ___
OFF: ___
ON: ___
DIM PERCENTAGE: ___

ENTER CONFIGURATION SELECTIONS

FIGURE 6

```
SCHEDULE CONFIGURATION TEMPLATE        ─35

PERIOD: ____
DAY: ____
TIME: FROM __:__ M TO __:__ M
SCENE NO.: __

ENTER CONFIGURATION SELECTIONS
```

SYSTEM FOR INTEGRATED LIGHTING CONTROL, CONFIGURATION, AND METRIC TRACKING FROM MULTIPLE LOCATIONS

This application is a Continuation of U.S. patent application Ser. No. 13/831,249, filed Mar. 14, 2013. U.S. patent application Ser. No. 13/831,249, filed Mar. 14, 2013, is hereby incorporated by reference.

BACKGROUND

The present disclosure pertains to lighting systems, and particularly to controlling of lighting systems. More particularly, the disclosure also pertains to configurations of lighting systems.

SUMMARY

The disclosure reveals a mechanism for control and configuration of a lighting system from a user interface. For instance, a wall module designed as a user interface for a tenant to control the system may be implemented so as to be used not only to control the lighting system but also to configure it. The lighting system may involve a controller, circuits of lights, relays, motion and ambient light detectors, scenes, schedules, and more. An additional user interface such as a wall module may be connected to the lighting system for control and configuration of the system.

BRIEF DESCRIPTION OF THE DRAWING

FIG. 6 is a diagram of a circuit configuration template;

FIG. 8 is a diagram of a schedule configuration template;

DESCRIPTION

Figure 1:
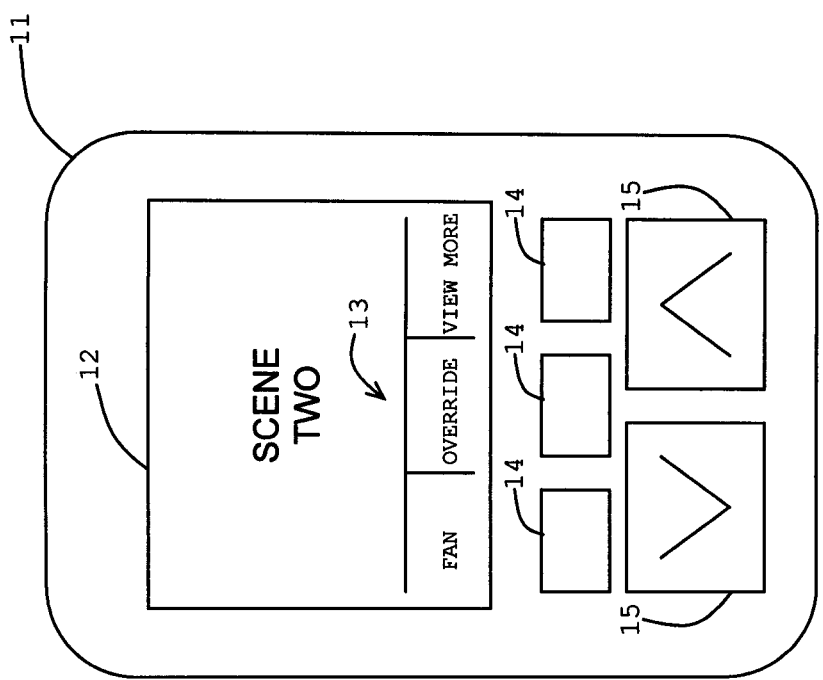
FIG. 1 is a diagram of a wall module that may have multiple uses such as lighting control and configuration, and heating, ventilation and heating control.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Related art lighting controls may have a separate configuration tool (other than the controls used to set the current lighting scene) for changing some portion of the system configuration. User controls may typically be located at convenient access locations, but the configuration tools may be located in a different location and require special tools, access or setup to use. If a portion of the system needs to be configured that requires these special tools it may take significant time to change a configuration.

In the present approach of configuring a lighting system, one may change virtually any configuration parameter at a tenant user interface. To do so, additional equipment would not necessarily be needed. The tenant user interface may allow configuration changes to be made more quickly since a special setup for configuring is not necessarily needed. In addition, more people may be authorized to make such changes since specialized equipment is not necessarily needed.

The present approach may be implemented by providing a user interface at a location where the lighting level is changed (i.e., the tenant user interface) that is also capable of configuring virtually any parameter in the lighting system. The approach may involve having an integrated user interface and configuration mechanism. The tenant in some cases may have limited configuration capabilities but an installer may have all of the available configuration capabilities.

Metrics may be observed at the user interface. Relays used for controlling lighting may have a finite lifespan, as may the lighting sources (e.g., bulbs, tubes, and so forth). The lifespan may be based on the total time that a circuit has been on and/or the number of on/off cycles that the circuit has experienced. Without this information, users may be forced to replace components of the lighting system based primarily off the calendar time when the components have been installed or wait until they fail. This approach may cause the components to be replaced prematurely, or to require urgent replacement when they fail, and thus involve increased expenses.

By tracking the total on-time for the circuit and the number of connecting cycles, the user may determine when to schedule replacement of the devices. Since no other outside equipment is necessarily needed to track the metrics of on-time and cycles, it may be easy for users to know when to schedule maintenance work for the lighting system. Metrics may incorporate a number of relay connections and disconnections for each circuit, durations of conduction of a load of each circuit, an amount of the load for each duration, and other information as desired.

Blocks added to a pre-loaded system may track the number of cycles and total on-time for each circuit. The system may provide a mechanism to reset these values on a per-circuit basis upon certain maintenance activities.

FIG. 1 is a diagram of a wall module 11 that may have multiple uses such as control and configuration of lighting systems. Module 11 may also be used as a thermostat in a heating, ventilation and air conditioning (HVAC) system. Module 11 may have a screen 12 with lower labels 13 for softkeys 14. Keys 15 may be for incrementing or setting values for a displayed parameter. Selection of "SCENE TWO", as shown, may be attained with keys 14 and 15. Various kinds of modes may be utilized for lighting control and configuration.

Figure 2:
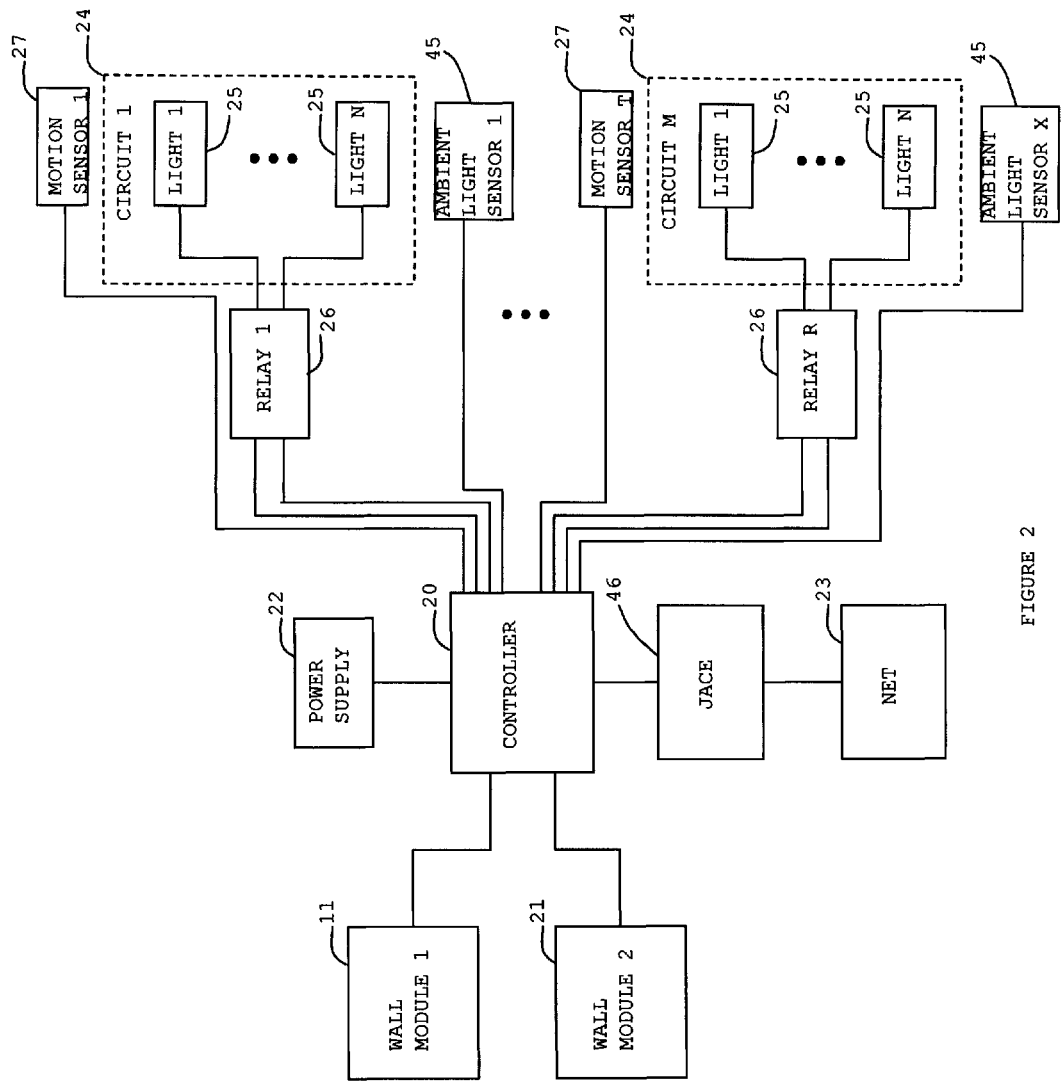
FIG. 2 is a schematic of a present lighting control and configuration system.

FIG. 2 is a diagram of a present lighting control and configuration system. A controller 20 may be connected to wall modules 11 and 21. Module 21 may be like module 11. A power supply 22 may be connected to controller 20. Controller 20 may be connected to a net or network 23 via a JAVA™ application control engine (JACE™) 46. JAVA is a trademark of Oracle America, Inc. and JACE is a trademark of Tridium, Inc. Control and configuration of the lighting may be operated by the controller in conjunction with wall module 11 or 21. A user may be limited to controlling lighting at module 11 or 21 in some designs. In such a case, a lock-out of configuring a lighting arrangement may be present. A code may be entered to remove the lock-out so a configuration mode can be accessed at the module.

The lighting system may incorporate lights arranged in circuits of one or more lights. A "light" may refer to one source, multiple sources of light, a group of lights, and the like.

There may be N lights 25 in a circuit 24 according to the diagram of FIG. 2. N may range from one to virtually any number. N may be different for various circuits. Often, there may be one light 25 in a circuit 24. Although a number of lights 25 may be referred to as one light 25. There may be M circuits 24 of lights 25 in a lighting arrangement. M may range from one to virtually any number. Each circuit 24 of lights 25 may be turned on or off with a relay 26. There may be from one to R relays 26. R may range from one to virtually any number. Often, there may be a one-to-one correlation of a relay to a circuit. However, there can be more than one relay per circuit in that, for example, each light within a group of lights covered by the circuit may have a relay.

A circuit 24 may have an associated motion sensor 27. Not necessarily all of the circuits 24 will have a motion sensor 27 associated with them. There may be from one to T motion sensors 27. T may range from one to virtually any number.

One or more circuits 24 of lights 25 may be selected with one or more relays 26. The circuits 24 of lights 25 may be situated in various areas of a building. Some circuits may be situated in the same area. Circuits may be configured and controlled at a wall module 11 or 21 by a user, and the control and configuration may be actualized at controller 20. Circuits 24 may be designated for various scenes at the wall module which indicates designations for the scenes to controller 20. The scenes may be scheduled by a user via the wall module 11 or 21 with signals to controller 20. A motion sensor 27 at an area of a circuit 24 of lights 25 may be set to activate circuit 24 of lights 25 when motion is detected in the area. If motion is not detected for a pre-determined amount of time, the respective circuit 24 of lights may be turned off.

A circuit 24 may have an associated ambient light sensor 45 which may indicate to controller 20 that light from at least one source is sufficient to result in turning off or dimming a circuit 24 of one or more lights 25 by controller 20. The thresholds, hystereses and time delays for turning on or off a circuit 24 via the ambient light sensor 45 may be determined by controller 24 and even configured at wall module 11 or 21. Settings for thresholds, hystereses and time delays of one circuit may be different than the thresholds, hystereses and time delays for another circuit even though just one ambient light sensor 45 is used for the two or more circuits 24.

At wall module 11 or 21, a user may configure the lighting arrangement for a building. On display 12 there may be different kinds of dialog boxes, menus, and the like, or other ways, for configuring the lighting arrangement. The approach shown in FIGS. 4-9 may be merely one example among several ways to make selections to effect a particular configuration of a lighting arrangement for a certain period of time. The approach here may be simplified or expanded in detail. Softkeys, increment keys, a keyboard on the display, a touch screen as a display, and other items may be presented in display 12 of module 11 or 21 for controlling and configuring the lighting arrangement.

Figure 3:
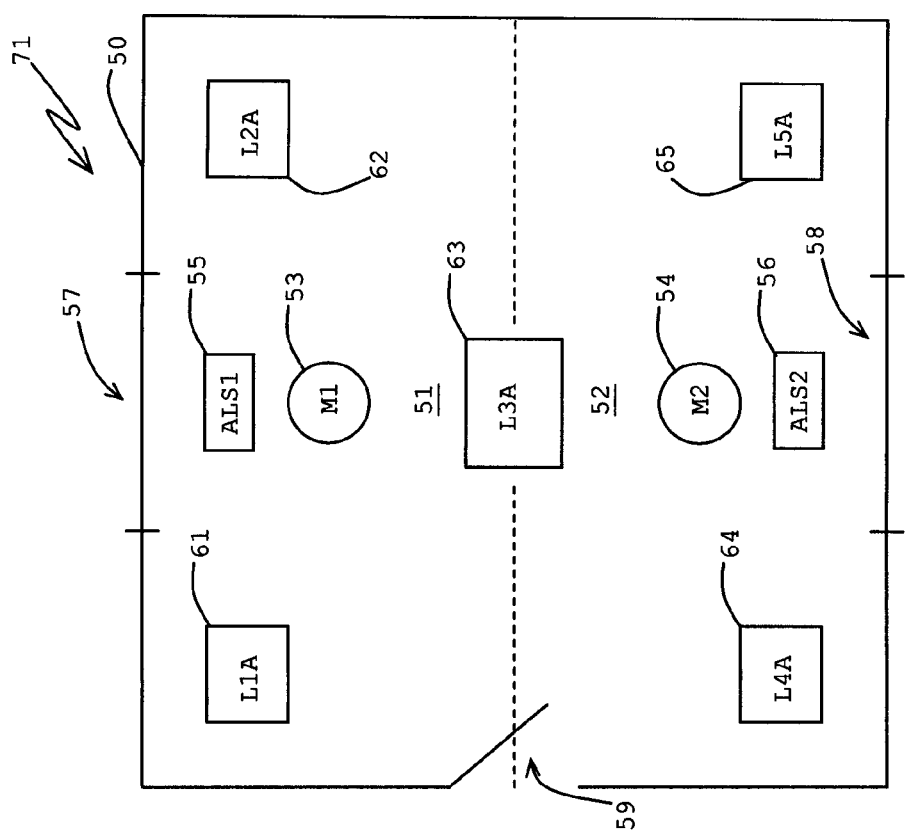
FIG. 3 is a diagram of an example lighting layout of a space for control and configuration.

FIG. 3 is a diagram 71 of a space 50 having an area 51 and area 52. Areas 51 and 52 may be delineated by a dashed line 53. The space may be entered through a door 59. Light 61 (L1A) and light 62 (L2A) may be situated in area 51 and light 64 (L4A) and light 65 (L5A) may be situated in area 52. Light 63 (L3A) may be situated approximately in the center of space 50. Lights 61-65 may each be single lights or groups of a multitude of lights.

Motion detector 53 (M1) may be situated in area 51 and motion detector 54 (M2) may be situated in area 52. An ambient light sensor 55 (ALS1) may be situated in area 51 where it may detect a combination of light from the lights in area 51 and light through, for example, a west window 57 of structure 50. Ambient light sensor 55 may detect a high level of ambient light from window 57 due to an afternoon sun and with a signal to the controller resulting in turning off lights 61 and 62 for a time that the ambient light intensity is sufficient to maintain the off condition of the lights.

An ambient light sensor 56 (ALS2) may be situated in area 52 where it may detect a combination of light from the lights in area 52 and light through an east window 58 of structure 50. Ambient light sensor 56 may detect a high level of ambient light from window 58 due to a morning sun and with a signal to the controller resulting in turning off lights 64 and 65 for a time that the ambient light intensity is sufficient to maintain the off condition of the lights.

Motion detectors 53 and 54 may send signals to a controller like a controller 20 in FIG. 2. Controller 20 may provide turn on signals to lights 61 and 62 relative to signals from motion detector 53. Controller 20 may provide turn on signals to lights 64 and 65 relative to signals from motion detector 54. The time out periods for lights 61 and 62 may be determined separately, and could be different durations of time for each of the lights even though the motion detection signal relative to the lights is from the same motion detector 53. Likewise, the time out periods for lights 64 and 65 may be determined separately, and could be different durations of time for each of the lights even thought the motion detection signal for the lights is from the same motion detector 54.

Controller 20 may provide turn off or turn on signals to lights 61 and 62 relative to intensity signals from ambient light sensor 55. Controller 20 may provide turn off or turn on signals to lights 64 and 65 relative to intensity signals from ambient light sensor 56. The turn off and turn on signals to lights 61 and 62 may be determined separately, and could occur for different intensity levels of light for each of the lights even thought the intensity signal is from the same ambient light sensor 55. Likewise, the turn off and turn on signals to lights 64 and 65 may be determined separately, and could occur for different intensity levels of light for each of the lights even thought the intensity signal is from the same ambient light sensor 56. In the present example, light 63 is not necessarily connected with respect to any of the motion detectors or ambient light sensors.

Figure 4:
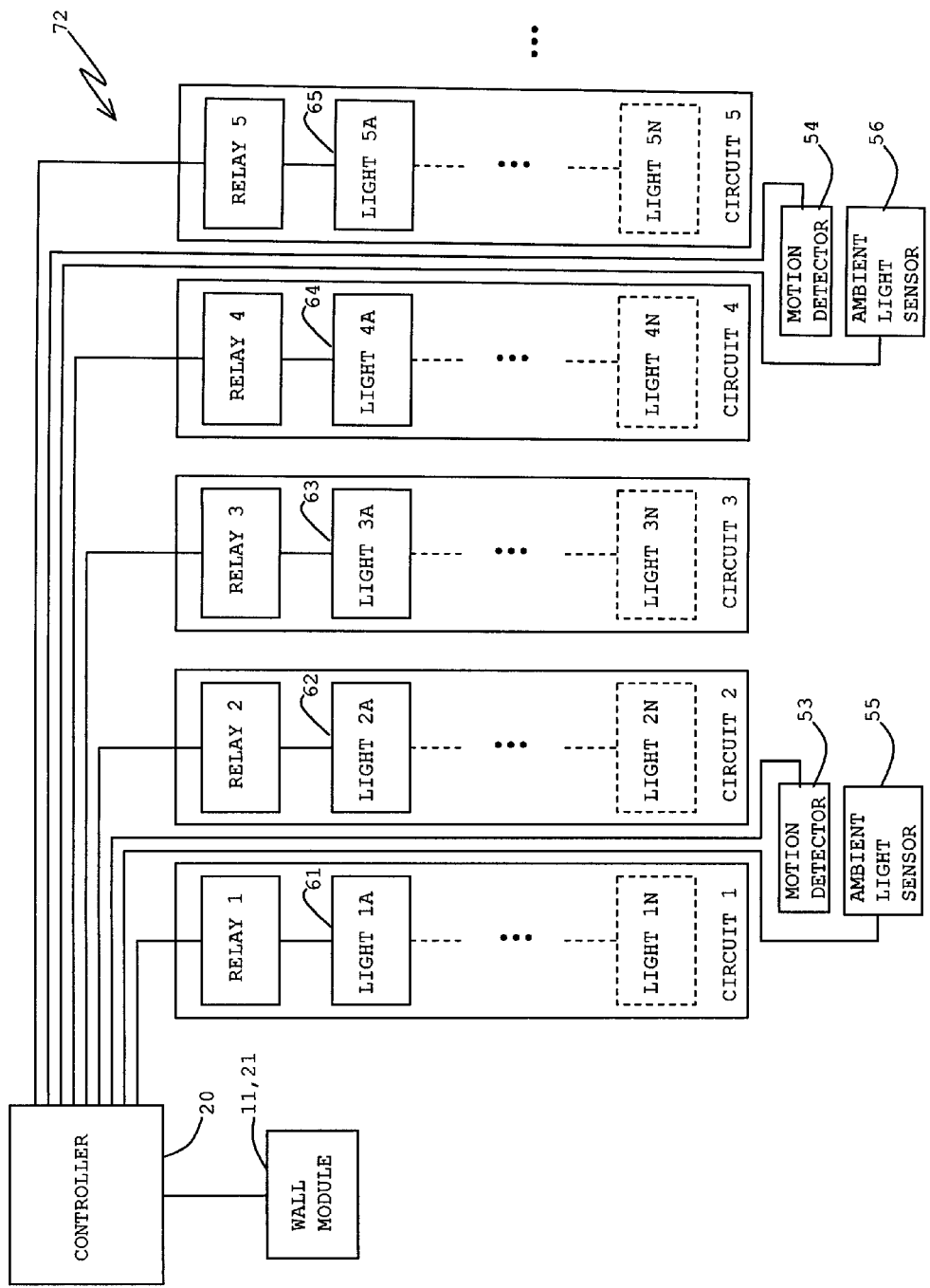
FIG. 4 is a diagram of a configuration that may be used to implement the lighting layout for the space of FIG. 3.

FIG. 4 is a diagram of a schematic 72 that may be used to implement the lighting layout for space 50 of FIG. 3. Relays 1-5 and corresponding lights 61-65 may be a part of circuits 1-5, respectively. Each circuit may be connected or disconnected relative to power with a relay. Each circuit may have one or more lights or groups of lights. Schematic 72 may incorporate motion detectors 53 and 54 and ambient light sensors 55 and 56.

Figure 5:
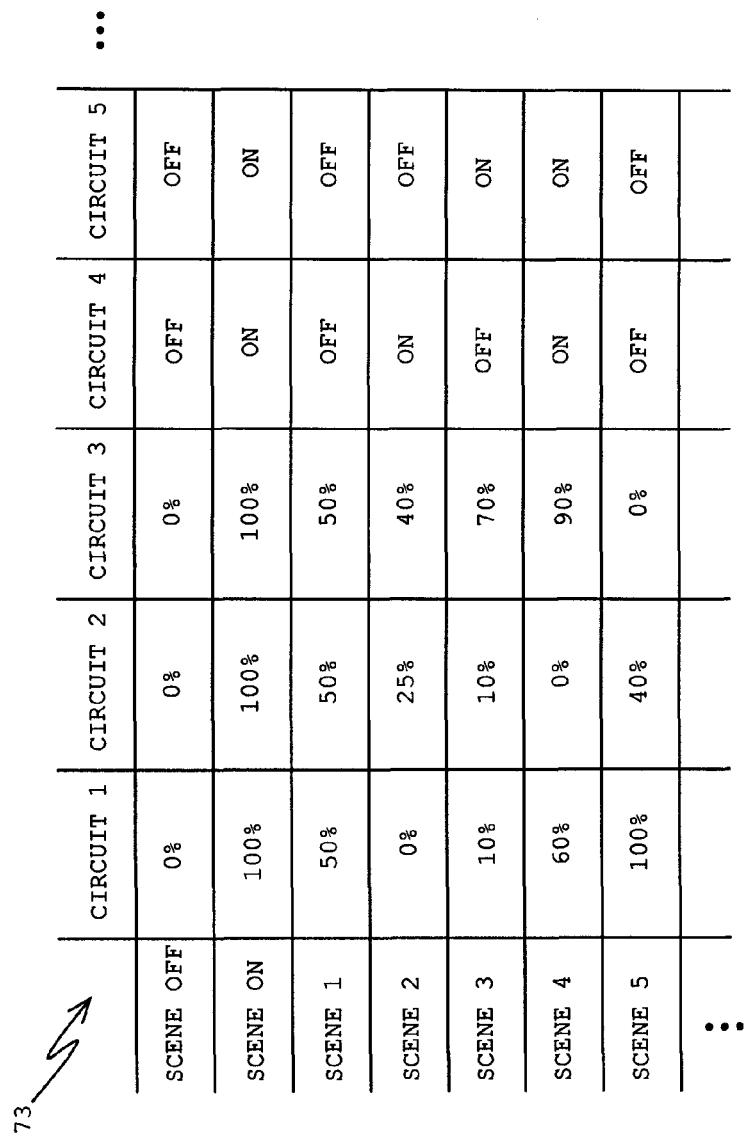
FIG. 5 is a diagram of a list of example circuit settings and scenes.

FIG. 5 is a diagram of a table 73 indicating an example of various settings for the components of circuits 1-5 of FIG. 4 and placing the settings into a context of various scenes.

Circuits 1-3 may be dimmable and circuits 4 and 5 are not necessarily dimmable. Scene off may have the lights of circuits 1-3 at zero brightness and the lights of circuits 4 and 5 turned off. Scene on may have the lights of circuits 1-3 at 100 percent and the lights of circuits 4 and 5 turned on. These scenes may be fixed. Scenes 1-5 may have a variety of selections for the circuits as the present selections are illustrative examples. Scene 1 may have a brightness of 50 percent for circuits 1-3 and off for circuits 4 and 5. Scene 2 may have a brightness of zero percent, 25 percent and 40 percent for circuits 1-3, respectively, an on for circuit 4 and an off for circuit 5. Scene 3 may have a brightness of ten percent for circuits 1 and 2, a brightness of 70 percent for circuit 3, and off for circuit 4 and an on for circuit 5. Scene 4 may have a brightness of 60 percent for circuit 1, zero percent for circuit 2, 90 percent for circuit 3, an on for circuit 4 and an on for circuit 5. Scene 5 may have a brightness of 100 percent for circuit 1, 40 percent foe circuit 2, zero percent for circuit 3, and an off for circuits 4 and 5. There may be more or less circuits and scenes.

Some of the motion detectors may have different time outs. For instance, motion detector 53 may have a time out of ten minutes. Motion detector 54 may have a time out of 15 minutes.

There may be ambient light sensors. Ambient light sensor 55 may indicate that light from, for instance, another source, such as the sun, may show that certain lights are not necessarily needed. A signal from an ambient light sensor to controller 20 may indicate that a certain light or lights are no longer needed and thus turned off, or that the brightness of the light or lights may be dimmed in view of another source of light, such as the sun.

A setting of an ambient light sensor may be set by controller 20 in response to a signal indicating detected lumens or a percentage of increase in ambient light of brightness over a predetermined setting of brightness in an area covered by lighting of one or more circuits. The same ambient light sensor may be used for the several circuits where the lighting change of each circuit may be affected with a different setting of lumens or percentage, as provided from controller 20. Controller 20 may also incorporate an appropriate hysteresis for each setting.

Configuring may be effected by entering information in templates as viewed in display 12 of module 11 or 21. FIG. 6 is a diagram of a circuit configuration template 31. Separate circuits may be configured for each light or grouping of lights 25. Circuits incorporating various arrangements of groupings of lights with different settings, such as dimming, may be made with template 31.

Template 31, in some approaches of configuring, might not necessarily be used or needed although it may be used here for illustrative purposes. A circuit may be designated with a number such as 1, 2 or so on. Circuits 24 of lights 25 may be designated. The circuits may each have virtually any number of lights situated in the same area or various areas. Often, a circuit 24 may consist of or be regarded as revealing one light 25; however, in some instances, the one light may represent more than one light such as an array of lights.

A dimming or dim percentage may be designated. Motion detector 27 may be designated as having a number of minutes for non-motion time-out or be designated as off in conjunction with controller 20 and wall module 11 or 21. Or there may not necessarily be a motion detector. A dim percentage may be set in conjunction with controller 20 and wall module 11 or 21 where lights 25 are not needed to operate at their fully rated brightness. Or a circuit may not necessarily be dimmable. There may also be an ambient light detector which may be set to turn off a certain lights if light from, for example, a window or a skylight is sufficient in the particular area where the lights are located. A room or space lit up well with outdoor light and at the same time having many lights on may appear to be an inefficient use of energy. When supplemental light decreases or becomes absent, a signal from the ambient light detector to controller 20 may result in certain in certain lights being turned on.

A time delay may be built in for the light ambient detector in conjunction with controller and wall module 11 or 21 to account for sudden changes in significant light levels. Various designs may be implemented to satisfy particular lighting desires for a building. The ambient light detector may be set to be off instead, thus allowing the lights to remain on despite supplemental or other light sources. Or there may not necessarily be an ambient light detector.

Figure 7:
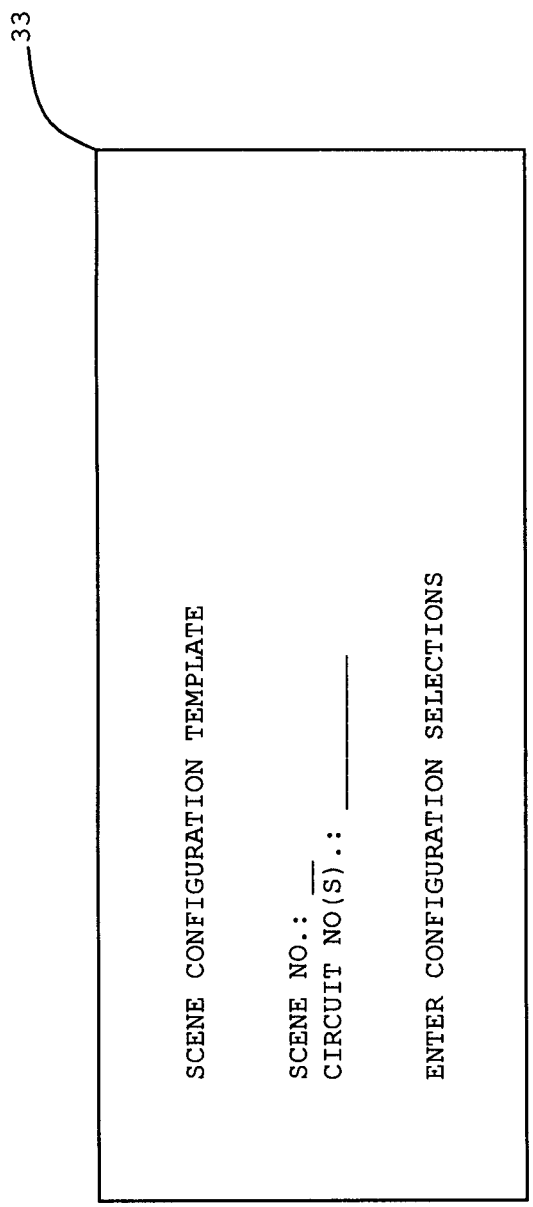
FIG. 7 is a diagram of a scene configuration template.

FIG. 7 is a diagram of a scene configuration template 33, which may appear on display 12. A scene number may be designated, such as, for example, one (1). Circuit nos., such as those listed in table 32 of FIG. 5, may be indicated in template 33 for a configuration of the respective scene.

FIG. 8 is a diagram of a schedule configuration template 35 for controlling lighting in various areas of a building. A period of time may be selected, such as a particular day or days, week, month or year. For instance, a period 1 may be selected. Other periods may be selected. For example, a period "W", which represents day 1, 2, and so on, may be selected. For an illustrative instance, day 1 of period W may be inserted in template 35. Also, a time from 6:00 AM to 6:00 PM may be inserted and a scene number 4 may be inserted in template 35. The configuration insertions, designations or selections may be made at display 12 of module 11 for entry into controller 20. Scenes may be entered for other times of the day or days. If no scenes are entered for the times of the day or days, one or more default scenes may be automatically entered.

Figure 9:
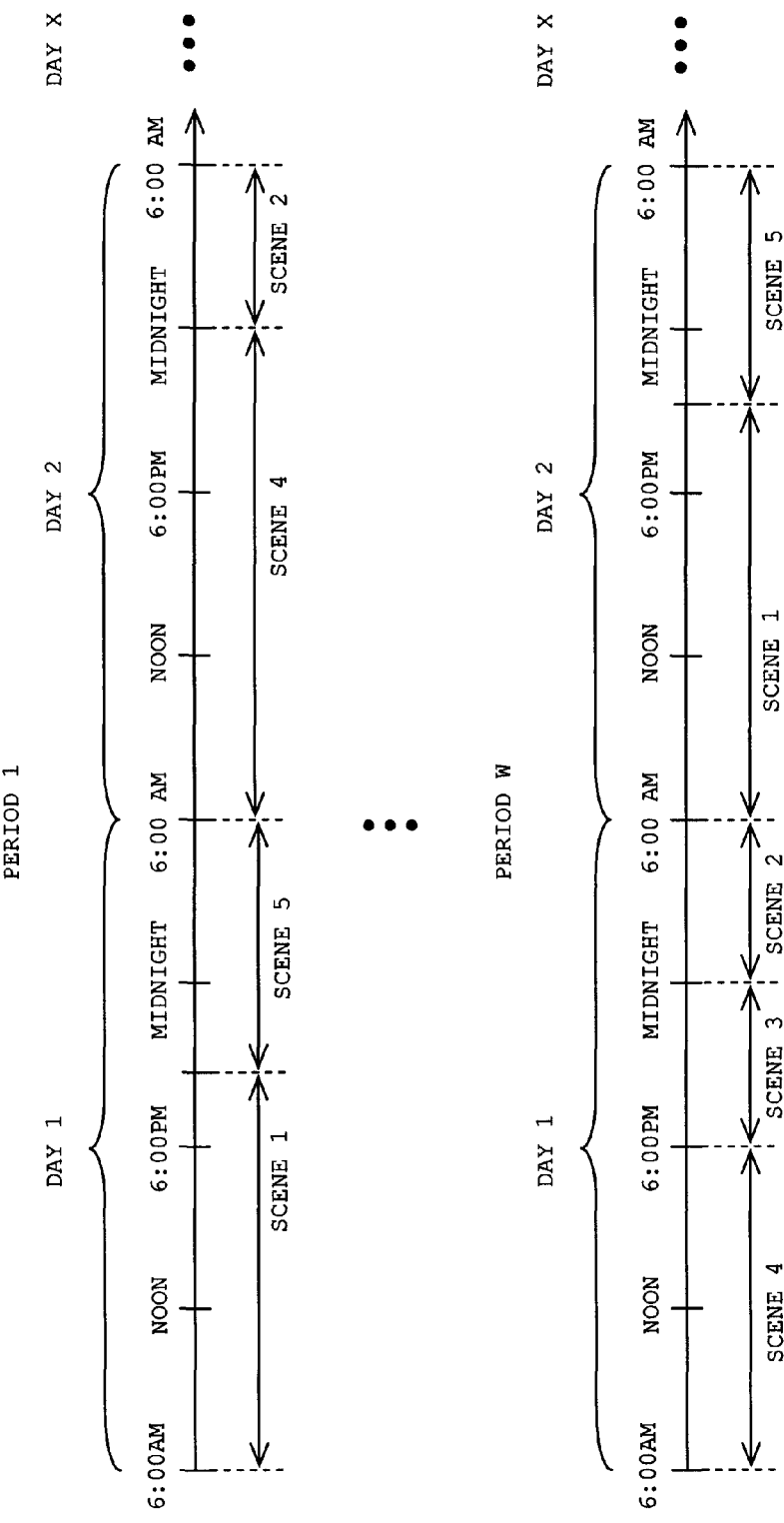
FIG. 9 is a diagram of example lighting schedules of scenes.

FIG. 9 is a diagram of lighting schedules 44 for the various times of days of a period. A period may be from a first day to a day X. X may range from one to virtually any desired number. The period may incorporate a day or days, a weekend, a week, a month, a year, or other designated periods. The number of periods may range from one to W. In FIG. 9, W may range from two to virtually any desired number. The described example time entry of template 35 of FIG. 8 for a scene 4 may be from 6:00 AM to 6:00 PM for day 1 in period W. Schedule configuration template 35 of FIG. 8 may be used to schedule the scenes listed in FIG. 5.

Figure 10:
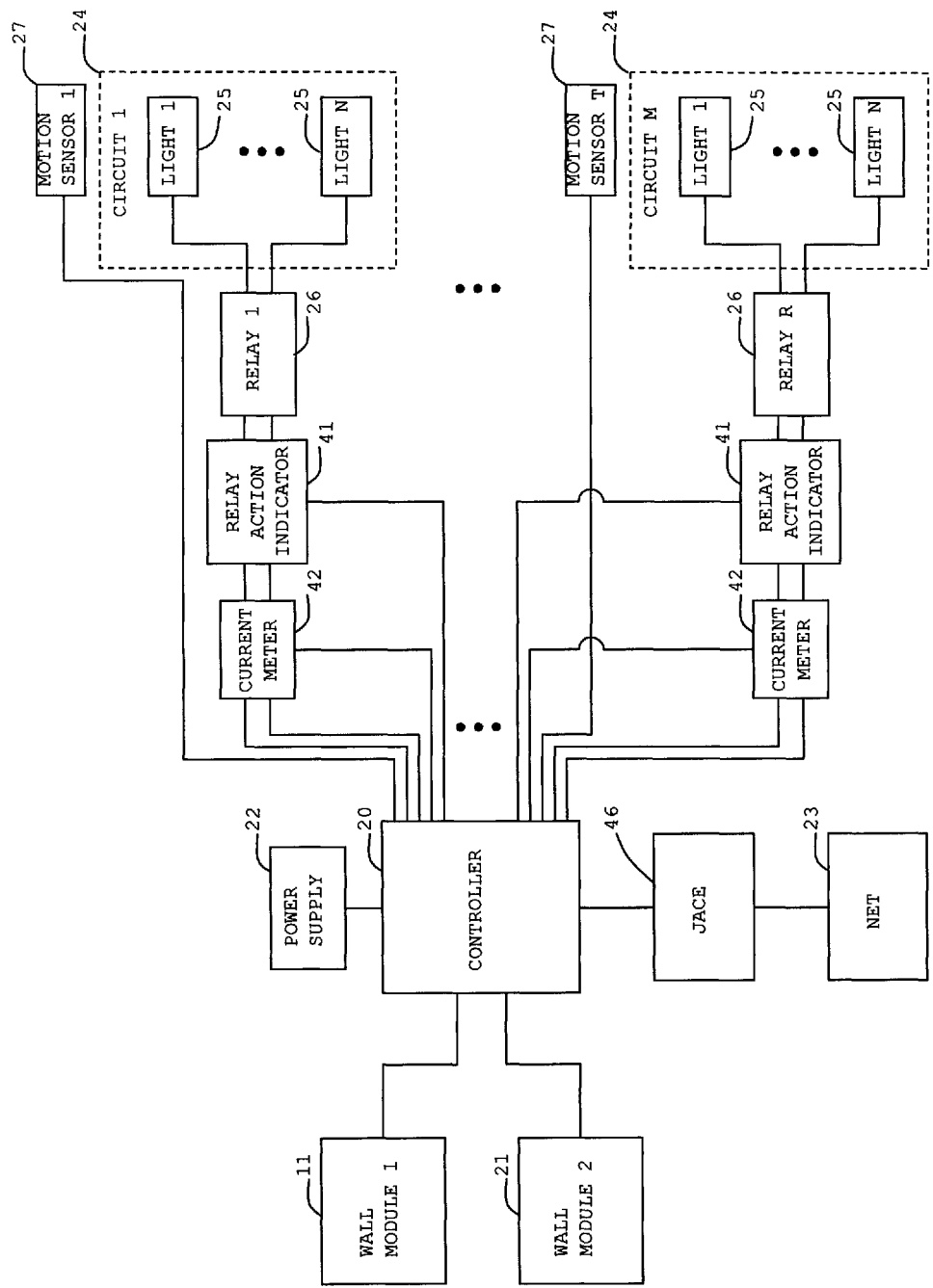
FIG. 10 is a diagram of the present lighting control and configuration system incorporating components for obtaining metrics.

Wall module 11 or 21, controller 20, and a relay action indicator 41, as shown in the diagram of FIG. 10, may be utilized to determine metrics such as the amount of time that lights 25 of the lighting arrangement have been on and the number of times that the relay has switched on. The metrics, along with information from net 23, such as lifetimes of lights 25 and relays 26 may be calculated with controller 20. Maintenance schedules may be developed by controller 20. The schedules may indicate when lights 25 and relay 26 should be replaced. Such maintenance may reduce costs in that lights 25 and relays 26 could be replaced before they fail. Disruption of activity, in a lighted area due to a failed relay 26 or light 25, may be costly in terms of the disruption of work in the corresponding lighted area and emergency arrival of one or more personnel for a replacement of relay 26 or light 25. With a calculated maintenance schedule, components such as relays 26 and lights 25 may be, for example, replaced in groups before any failures occur. The cost of maintenance per component may be much less than the replacement cost for an individual failed component.

Even though an amount of time that a circuit 24 of lights 25 is on may be determined by monitoring relay 26 with relay action indicator 41, monitoring current with a current meter 42, as shown in the diagram of FIG. 13, may provide a more accurate estimation of lifetimes of lights 25 with an assumption that the lights which are dimmed use less current and thus may last longer than those which are not dimmed. A cost reduction due to current monitoring may result in extending the time due for a scheduled replacement of lights 25. Applying the same rationale for relays 26 conducting less current may extend the time due for a scheduled replacement of relays 26.

To recap, an integrated lighting control and configuration system for a building, may incorporate a controller, a tenant user wall module connected to the controller, one or more circuits having one or more lights, one or more relays connected the one or more circuits, respectively, and to the controller, and one or more scenes incorporating the one or more circuits. Some of the one or more circuits of the one or more scenes may be configured at the tenant user wall module.

The system may further incorporate a motion detector associated with one or more circuits. Upon detection by the motion detector of a person or an object in an area of the one or more lights of one or more circuits, the one or more lights of the one or more circuits may be turned on. The one or more lights of the one or more circuits may be turned off after a predetermined period subsequent to a most recent detection of motion by the motion detector of a person or an object.

A predetermined period of time of a motion detector for one circuit may be different than a predetermined period of time of the same motion detector for another circuit. Some of the one or more circuits may be connected to the controller that has a dimmer setting for a predetermined value of brightness in that when one or more lights of the one or more circuits are emitting light, the one or more lights emit light at the predetermined value of brightness that is equal to or less than a maximum brightness of the one or more lights. The predetermined value of brightness may be determined at the tenant user wall module.

The system may further incorporate an ambient light detector in an area of the one or more lights of the one or more circuits. If the ambient light detector detects ambient light, in an area of the light or lights of the one or more circuits, having a value of brightness greater than a predetermined value of brightness, then some of the one or more lights of the one or more of circuits may be dimmed or turned off.

The system may further incorporate an ambient light detector in an area of one or more lights of two or more circuits. If the ambient light detector detects ambient light, in the area of one or more lights of one of the two or more circuits, having a value greater than a first predetermined value of brightness, then the one or more lights of the one of the two or more of circuits may be dimmed or turned off. If the ambient light detector detects ambient light in an area of one or more lights of another one of the two or more circuits, having a value greater than a second predetermined value of brightness, then the one or more lights of the other one of the two or more of circuits may be dimmed or turned off. The second predetermined value may be different than the first predetermined value.

The system may further incorporate a relay action indicator connected to the one or more relays connected to the one or more circuits, respectively, and to the controller. The relay action indicator may count a number of times that the one or more relays switch.

A maximum of a number of times that the one or more relays can switch for a lifetime of the one or more relays may be determined. The number of times that the one or more relays have switched may indicate an amount of lifetime of the one or more relays expended. A schedule for maintenance or replacement of the one or more relays before an end of the lifetime of the one or more relays may be determined.

The one or more scenes may be placed in a schedule at the tenant user wall module via the controller. A schedule may indicate each portion of a time period when one of the one or more scenes incorporates one or more circuits connected to a power source.

A control and configuration apparatus for a lighting system may incorporate one or more tenant user interfaces, a controller connected to the one or more tenant user interfaces and to one or more relays, one or more circuits of one or more lights connected to the one or more relays, respectively, and one or more motion detectors situated in an area of the one or more lights of the one or more circuits. At the one or more tenant user interfaces, some of the one or more circuits of lights may be configurable relative to non-motion turn off durations of the one or more motion detectors. One or more scenes may incorporate one or more circuits of lights.

A motion detector of the one or more motion detectors may be proximate to an area of one or more lights of two or more circuits. The motion detector may be connected to the controller and the controller may provide non-motion time-out durations for each of the two or more circuits and activate the respective relays accordingly for turning on and off the circuits in response to a presence and absence of motion detection, respectively. The non-motion time-out durations for each of the two or more circuits may be different from one another.

At the one or more tenant user interfaces, the one or more motion detectors may be configurable in terms of non-motion time-out durations at the controller via the one or more tenant user interfaces in terms of non-motion time-out durations.

A dimming of one or more circuits of lights may be determined by a selection at the tenant user interface, provided to the controller.

A schedule may be configured with the one or more scenes, and the one or more scenes may be activated according to the schedule. The schedule may be provided in terms of minutes, hours, days, weeks, and/or months, for activating the one or more scenes.

An approach, for controlling and configuring a lighting arrangement for a building, may incorporate providing one or more circuits of lights, connecting each of the one or more circuits to a controller via one or more relays, and configuring one or more scenes with the one or more circuits at a user control module via corresponding signals to the controller.

The approach may further incorporate providing a motion detector situated in an area of lights of two or more circuits, respectively. Non-motion time-out periods from the controller for the motion detector for each circuit may be set at the user control module. The time-out periods for the two or more circuits may differ from one another.

The approach may further incorporate providing power having a dimming effect on the lights of the one or more circuits, respectively. The dimming effect on the lights of the one or more circuits may be set at the user control module.

The approach may further incorporate providing one or more relay action indicators connected to the one or more relays and the controller. The one or more relay action indicators may count a number of connecting actions and measure durations of connections of the one or more relays to power, over a pre-determined period of time.

The approach may further incorporate obtaining lifetime information about the lights of the one or more circuits, calculating estimated lifetimes for the lights of the one or more circuits from the number of connecting actions and durations of connections of the one or more relays to power, over a pre-determined period of time, and from the lifetime information, and scheduling maintenance incorporating replacement of the lights in the one or more circuits before an end of their estimated lifetimes.

The approach may further incorporate obtaining lifetime information at the user control module via the controller and the net about the relays of the one or more circuits, calculating estimated lifetimes for the relays in the one or more circuits from a number of connecting actions and durations of connections over a pre-determined period of time and from the lifetime information, and scheduling maintenance incorporating replacement or refurbishment of the relays in the one or more circuits before an end of their estimated lifetimes.

The approach may further incorporate configuring a lighting schedule by incorporating the one or more scenes, with the controller via the user control module. The scenes may be selected at the user control module for placement in the lighting schedule.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A lighting control system for a building, comprising:
   a controller;
   a user interface in communication with the controller;
   at least one circuit having one or more lights;
   at least one relay connected the at least one circuits and to the controller; and
   two or more scenes stored in a memory of the controller, the two or more scenes including configurations of the one or more lights of the at least one circuit; and
   a monitoring mechanism configured to determine one or more metrics of the at least one circuit; and
   wherein:
   the two or more scenes are configurable at the user interface to specify a dim percentage of the one or more lights of the at least one circuit;
   the two or more scenes are each configured to be in use at a predetermined period of time;
   a maximum of a number of times that the at least one relay can switch for a lifetime of the at least one relay is determined;
   the number of times that the at least one relay has switched indicates an amount of lifetime of the at least one relay has expended; and
   a schedule for maintenance or replacement of the at least one relay before an end of the lifetime of the at least one relay is determined.

2. The lighting control system of claim 1, wherein the monitoring mechanism is configured to count a number of times that the at least one relay switches on and/or off.

3. The lighting control system of claim 1, wherein the monitoring mechanism is configured to determine an amount of time the one or more lights have been on.

4. The lighting control system of claim 1, further comprising:
   a motion detector associated with at least one circuit; and
   wherein:
   upon a detection by the motion detector of a person or an object in an area of the one or more lights of the at least one circuit, the one or more lights of at least one circuit are turned on; and
   the one or more lights of the at least one circuit are turned off after a predetermined period subsequent to a most recent detection of motion by the motion detector of a person or an object.

5. The system of claim 4, wherein a predetermined period of time of a motion detector for a first circuit of the at least one circuit can be different than a predetermined period of time of the same motion detector for another circuit of the at least one circuit.

6. The system of claim 1, wherein:
   the controller has a dimmer setting for a predetermined value of brightness in that when one or more lights of the one or more circuits are emitting light, the one or more lights emit light at the predetermined value of brightness that is equal to or less than a maximum brightness of the one or more lights; and
   the predetermined value of brightness can be determined at the user interface.

7. The system of claim 1, further comprising:
   an ambient light detector in an area of the one or more lights of the at least one circuit; and
   wherein if the ambient light detector detects ambient light in an area of the light or lights of the at least one circuit having a value of brightness greater than a predetermined value of brightness, then some of the one or more lights of the at least one circuit are dimmed or turned off.

8. The system of claim 1, further comprising:
   an ambient light detector in an area of one or more lights of two or more circuits;
   wherein:
   if the ambient light detector detects ambient light in the area of one or more lights of one of the two or more circuits having a value greater than a first predetermined value of brightness, then the one or more lights of the one of the two or more of circuits are dimmed or turned off;
   if the ambient light detector detects ambient light in an area of one or more lights of another one of the two or more circuits having a value greater than a second predetermined value of brightness, then the one or more lights of the other one of the two or more of circuits are dimmed or turned off; and
   the second predetermined value can be different than the first predetermined value.

9. The system of claim 1, wherein:
   the two or more scenes are placed in a schedule at the user interface via the controller; and
   a schedule indicates each portion of a time period when one of the two or more scenes comprises at least one connected to a power source.

10. A control and configuration system for a lighting system, comprising:

two or more user interfaces, the two or more user interfaces each capable of individually receiving a user input;

a controller in communication with each of the two or more user interfaces and to two or more relays;

two or more circuits of one or more lights connected to the two or more relays, respectively; and two or more motion detectors situated in an area of the one or more lights of the two or more circuits; and wherein:

at least some of the two or more circuits of lights are configurable at the two or more user interfaces to turn off in response to non-motion detected at least one of the two or more motion detectors.

11. The system of claim 10, wherein one or more lengths of time of non-motion for the two or more circuits is stored in a template.

12. The system of claim 11, wherein the template is viewable on a display of at least one of the two or more user interfaces.

13. The system of claim 11, wherein the one or more lengths of time of non-motion are configurable at the two or more user interfaces.

14. The system of claim 10, wherein one or more scenes comprise the two or more circuits of lights.

15. The system of claim 10, wherein:

at least one of the two or more motions detectors is connected to the controller and the controller provides non-motion time-out durations for each of the two or more circuits and activates the respective relays accordingly for turning on and off the circuits in response to a presence and absence of motion detection, respectively; and the non-motion time-out durations for each of the two or more circuits can be different from one another.

16. The system of claim 10, wherein a dimming of one or more circuits of lights is determined by a selection at one of the two or more user interfaces.

17. The system of claim 10, wherein:

a schedule is configured with one or more scenes, and the one or more scenes are activated according to the schedule; and the schedule is provided in terms of minutes, hours, days, weeks, months, for activating the one or more scenes.

18. A method for controlling and configuring a lighting arrangement for a building, comprising:

configuring one or more scenes with one or more circuits at a user control module, the one or more circuits connected to a controller via one or more relays;

communicating the one or more scenes to the controller, the controller configured to control one or more lights on each of the one or more circuits in accordance with the one or more scenes, the one or more scenes configured to be activated at a one or more predetermined times at a predetermined dim percentage;

providing one or more monitoring mechanisms connected to the one or more relays and the controller; and wherein the one or more monitoring mechanisms are configured to determine one or more metrics of the one or more circuits including at least a maximum of a number of times that a relay can switch for a lifetime of the relay; and wherein the controller is configured to determiner a schedule for maintenance or replacement of the relay before an end of the lifetime of the relay.

19. The method of claim 18, wherein the one or more monitoring mechanisms are configure to determine a number of connecting actions and measure durations of connections of the one or more relays to power, over a predetermined period of time.

* * * * *